March 27, 1945.  L. MARTON  2,372,443

CORRECTION OF ELECTROMAGNETIC LENS

Filed April 22, 1942

Inventor
Ladislaus Marton
By C. W. Duska
Attorney

Patented Mar. 27, 1945

2,372,443

UNITED STATES PATENT OFFICE 2,372,443

CORRECTION OF ELECTROMAGNETIC LENSES

Ladislaus Marton, Palo Alto, Calif., assignor to Radio Corporation of America, a corporation of Delaware Application April 22, 1942, Serial No. 440,095

5 Claims. (Cl. 250—161)

This invention relates generally to magnetic electron lenses, and particularly to the correction of aberration in the magnetic field of such lenses.

Heretofore, it has been common to shape the ferromagnetic elements of such lens systems to focus substantially all of the electrons passing through the lens system. However, existing electromagnetic lenses possess aberrations which limit their resolving power. This invention contemplates the use of diamagnetic elements suitably placed in the magnetic field to correct for distortion or aberration inherent in the conventional magnetic electron lenses. Such diamagnetic elements will tend to repel the portion of the magnetic field passing therethrough and hence may be used to control the distribution of the field immediately adjacent thereto. Many substances are diamagnetic in varying degrees. Some of these materials are bismuth, aluminum, glass, pure copper, wood, paper and various plastics.

An object of this invention is to provide means for shaping the magnetic field of an electron lens by the introduction of suitably shaped diamagnetic elements or substances in the field. Another object is to provide means for correcting aberration or distortion in a magnetic electron lens by the insertion of one or more diamagnetic elements in the magnetic field of the lens. Still another object is to provide a combination of ferromagnetic or paramagnetic and diamagnetic substances in the magnetic field of an electron lens to correct for distortion common to the usual ferromagnetic element. An additional object is to provide means for coating magnetic lens elements with diamagnetic substances to alter slightly the shape and characteristics of their magnetic field.

The invention will be further described by reference to the drawing in which Figure 1 is an elevational view illustrating the principal magnetic field between opposite magnetic poles; Figure 2 is an elevational view illustrating the distortion of the field by the introduction of diamagnetic elements; Figure 3 is an elevational view of a magnetic electron lens; Figure 4 is an elevational view of a magnetic electron lens embodying the invention; Figure 5 is an elevational view of another embodiment of the invention; and Figure 6 is an elevational view of a further modification of the invention. Similar reference characters are applied to similar elements in the drawing.

Referring to Fig. 1, the curved lines X represent the magnetic field between the poles N and S of a magnet. The introduction of the diamagnetic elements D, D' tend to constrict or intensify the magnetic field between the pole pieces N and S as shown in Fig. 2. It will be understood that the degree of intensification is intentionally exaggerated in the drawing better to illustrate the phenomenon.

Fig. 3 illustrates the aberration common to a conventional type of magnetic electron lens. A typical electromagnetic lens E, consisting of two magnets A and B, the poles N and S of which are placed in opposition and are arranged to form magnetic fields coaxial with the electron beam Y. The focusing of the electron beams, by the electron lens E, is shown by dash lines. The foci of all electron paths do not coincide; typical foci, occurring at different points on the lens axis, being shown as $F_1$ and $F_2$.

Figure 1:
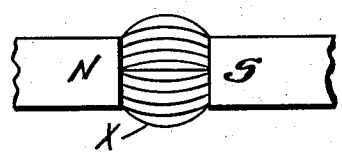
Figure 5:
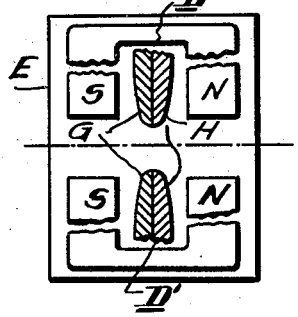
Fig. 5 shows a magnetic electron lens including diamagnetic elements D and D', similar in purpose, shape and location to elements D and D' of Fig. 4, but each composed of diamagnetic section F and paramagnetic or ferromagnetic section G.
Figure 2:
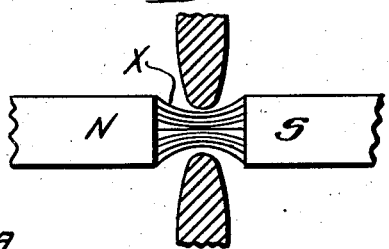
Figure 3:
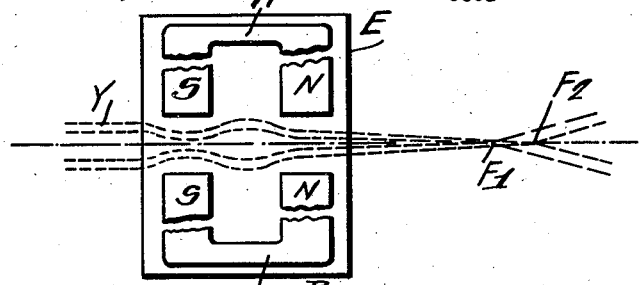
Figure 6:
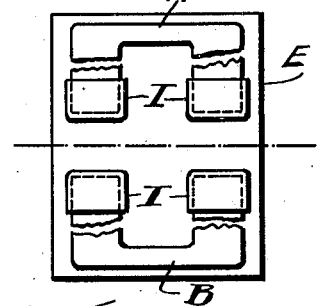
Fig. 6 shows a magnetic electron lens in which the pole pieces S and N are coated with diamagnetic material H to correct for aberration inherent in the lens of Fig. 3.
Figure 4:
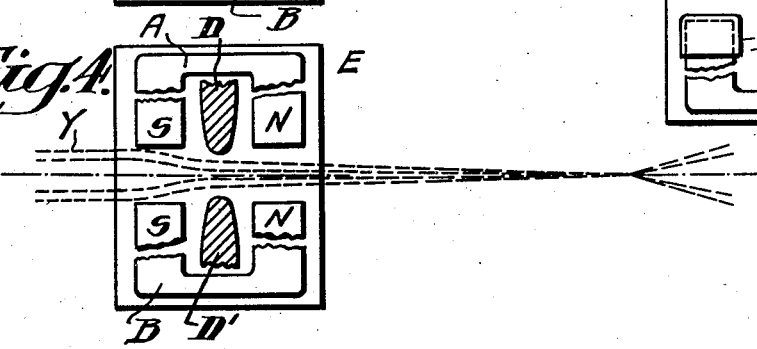
Fig. 4 shows a magnetic electron lens including diamagnetic elements D and D', shaped and located to correct for the aberration inherent in the lens of Fig. 3. It will be seen that the foci of all electron beams tend substantially to coincide at F.

While the use described pertains principally to the correction of aberration in an electron lens, it will be obvious to one skilled in the art that by suitable design of the shapes and locations of one or more diamagnetic elements, a magnetic field can be altered in any desired manner. The principal limitation on the design of such devices is the limited degree of diamagnetism obtainable with known materials.

A modification of the invention is to provide a combination of diamagnetic and paramagnetic materials in the magnetic structure of the lens.

An additional modification is to coat at least part of the paramagnetic structure of the lens with a diamagnetic material to correct for aberration of the field of the lens without such a coating.

I claim as my invention:

1. A magnetic electron lens system including means for establishing a magnetic field, means for applying said field to focus an electron beam passed therethrough, and means for correcting lens field aberrations comprising diamagnetic elements disposed in said lens magnetic field, said elements being shaped concavedly toward and located in immediate proximity to the path of said beam through said applied field for altering the conformation of said field in opposite sense to and to a degree substantially to correct for said aberrations.

2. A magnetic electron lens including means for establishing a magnetic field, means for applying said field to focus an electron beam passed therethrough, and means including at least one diamagnetic member in said magnetic field, said member being shaped concavedly toward and located in immediate proximity to the path of said beam through said applied field for altering the conformation of said field in opposite sense to and to a degree substantially to correct for aberrations in the electron focus of said magnetic field.

3. An electromagnetic lens, comprising in combination, means including ferro-magnetic lens elements for establishing a magnetic field, means for applying said field to focus an electron beam passed therethrough, and means for correcting lens field aberrations comprising diamagnetic elements disposed in said lens magnetic field adjacent to said ferro-magnetic lens elements, said diamagnetic elements being shaped concavedly toward and located in immediate proximity to the path of said beam through said applied field for altering the conformation of said field in opposite sense to and to a degree substantially to correct for said aberrations.

4. An electromagnetic lens comprising, in combination, means including ferro-magnetic lens elements for establishing a magnetic field, means for applying said field to focus an electron beam passed therethrough, and means for correcting lens field aberrations comprising a combination of diamagnetic and ferro-magnetic elements disposed in said lens magnetic field, said combined elements being shaped concavedly toward and located in immediate proximity to the path of said beam through said applied field for altering the conformation of said field in opposite sense to and to a degree substantially to correct for said aberrations.

5. An electromagnetic lens comprising, in combination, means including ferro-magnetic lens elements for establishing a magnetic field, means for applying said field to focus an electron beam passed therethrough, and means for correcting lens field aberrations comprising a coating of diamagnetic material on at least a portion of said ferro-magnetic lens elements in the magnetic field of said lens, said coated portions of said lens elements being interposed toward and located in immediate proximity to the path of said beam through said applied field for altering the conformation of said field in opposite sense to and to a degree substantially to correct for said aberrations.

LADISLAUS MARTON.